US007885752B2

(12) United States Patent
Kawamura et al.

(10) Patent No.: US 7,885,752 B2
(45) Date of Patent: Feb. 8, 2011

(54) CONTROL SYSTEM FOR INTERNAL COMBUSTION ENGINE

(75) Inventors: Kazunori Kawamura, Wako (JP); Futoshi Nishioka, Wako (JP); Osamu Kitamura, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 240 days.

(21) Appl. No.: 12/289,188

(22) Filed: Oct. 22, 2008

(65) Prior Publication Data
US 2009/0112443 A1 Apr. 30, 2009

(30) Foreign Application Priority Data
Oct. 26, 2007 (JP) ............... 2007-278261

(51) Int. Cl.
B60T 7/12 (2006.01)
G05D 1/00 (2006.01)
G06F 7/00 (2006.01)
G06F 17/00 (2006.01)

(52) U.S. Cl. ............... 701/103; 701/113; 123/399; 123/362

(58) Field of Classification Search ............... 701/102, 701/103, 110, 111, 113, 114; 123/179.16, 123/179.18, 179.5, 339.14, 344, 349, 350, 123/361, 362, 396, 399, 402, 403, 406.45, 123/435, 436
See application file for complete search history.

(56) References Cited

U.S. PATENT DOCUMENTS 4,781,162 A * 11/1988 Ishikawa et al. ............ 123/399
4,785,782 A * 11/1988 Tanaka et al. ............... 123/399
4,987,871 A * 1/1991 Nishikawa .................. 123/362
5,233,530 A * 8/1993 Shimada et al. ............. 701/107
7,725,245 B2 * 5/2010 Kawamura et al. .......... 701/110
2005/0209045 A1* 9/2005 Lewis ......................... 477/107
2007/0119242 A1* 5/2007 Buck et al. .................. 73/118.1
2007/0119410 A1 5/2007 Leone et al.

FOREIGN PATENT DOCUMENTS

| JP | 2-20742 | 2/1990 |
|---|---|---|
| JP | 3-13541 | 3/1991 |
| JP | 03-253733 | 11/1991 |
| JP | 2006-283741 | 10/2006 |
| JP | 2008-115806 | 5/2008 |
| WO | WO 2008/078162 A2 | 7/2008 |

OTHER PUBLICATIONS

European Search Report, EP 08 01 8191, dated Mar. 4, 2009.

* cited by examiner

*Primary Examiner*—Stephen K. Cronin
*Assistant Examiner*—Anthony L Bacon
(74) *Attorney, Agent, or Firm*—Squire, Sanders & Dempsey L.L.P.

(57) ABSTRACT

A control system for an internal combustion engine in which fuel containing alcohol is used. In the control system, a maximum opening of a throttle valve of the engine is set, and a target opening of the throttle valve is set to a value which is equal to or less than the maximum opening. An opening of the throttle valve is controlled so as to coincide with the target opening. The maximum opening is according to a concentration parameter indicative of a concentration of alcohol in the fuel, a temperature parameter indicative of a temperature of the engine, and a number of ignitions performed after start of the engine.

12 Claims, 8 Drawing Sheets

CONTROL SYSTEM FOR INTERNAL COMBUSTION ENGINE

BACKGROUND OF THE INVENTION

1. Field of the Invention

The present invention relates to a control system for an internal combustion engine, and particularly to a control system for an internal combustion engine in which fuel containing alcohol is used.

2. Description of the Related Art

Japanese Patent Laid-open No. H3-253733 (JP-'733) discloses a method for controlling a throttle valve opening in an internal combustion engine in which alcohol, gasoline, or composite fuel of alcohol and gasoline (gasohol) is used. According to this control method, a target throttle valve opening is set according to a concentration of alcohol in the fuel, a depression amount of an accelerator pedal, and an engine rotational speed, so that constant drivability of the engine (engine output) is obtained regardless of the concentration of alcohol in the fuel. Further, an actual throttle valve opening is controlled to coincide with the target throttle valve opening.

Further, Japanese Utility Model Laid-open No. H2-20742 (JP-'742) discloses a throttle valve opening adjusting device for an internal combustion engine in which gasoline is used as fuel. According to this device, a maximum throttle valve opening is set according to an engine rotational speed and an engine coolant temperature, and a target throttle valve opening, which is set according to the depression amount of the accelerator pedal, is limited to a value which is equal to or less than the maximum throttle valve opening. According to such limitation, the combustion state of the engine is prevented from deteriorating especially when the engine temperature is low.

In the internal combustion engine in which fuel containing alcohol is used, the combustion state may deteriorate with high possibility especially when the accelerator pedal is greatly depressed immediately after the cold start of the engine and the throttle valve is opened according to the depression amount. In the control method of JP-'733, suppressing deterioration of the drivability of the engine is taken into consideration. However, a problem of deterioration of the combustion state is not taken into consideration. Further, in the device of JP-'742, the engine coolant temperature is taken into consideration, which is, however, not sufficient for preventing the combustion state from deteriorating.

SUMMARY OF THE INVENTION

The present invention was made contemplating the above described points, and an object of the invention is to provide a control system for an internal combustion engine, which can maintain a good combustion state and suppress deterioration of the drivability immediately after the cold start of the engine in which fuel containing alcohol is used.

To attain the above object, the present invention provides a control system for an internal combustion engine in which fuel containing alcohol is used. The control system can include maximum opening setting means, target opening setting means, and throttle valve opening control means. The maximum opening setting means sets a maximum opening of a throttle valve of the engine. The target opening setting means sets a target opening of the throttle valve to a value which is equal to or less than the maximum opening. The throttle valve opening control means controls an opening of the throttle valve so as to coincide with the target opening. The maximum opening setting means sets the maximum opening according to a concentration parameter indicative of a concentration of alcohol in the fuel, a temperature parameter indicative of a temperature of the engine, and a number of ignitions performed after start of the engine.

With this configuration, the maximum opening of the throttle valve is set according to the concentration parameter indicative of the concentration of alcohol in the fuel, the temperature parameter indicative of the temperature of the engine, and the number of ignitions after start of the engine. Further, the throttle valve opening is limited to a value which is equal to or less than the maximum opening. The engine temperature upon starting of the engine and the number of ignitions after start of the engine are significantly correlative with the temperature in the combustion chamber of the engine. Therefore, by setting the maximum opening according not only to the concentration parameter but also to the engine temperature parameter and the number of ignitions after start of the engine, the maximum opening can be set to a value suitable for the temperature in the combustion chamber. Consequently, good combustion state can be maintained while suppressing deterioration of the drivability by preventing the throttle valve opening from being subjected to excessive limitation.

Preferably, the maximum opening setting means includes combustion state detecting means for detecting deterioration of a combustion state of the engine, and corrects the maximum opening in a decreasing direction when the deterioration of the combustion state is detected.

With this configuration, the maximum opening is corrected in the decreasing direction when deterioration of the combustion state is detected. Accordingly, it is possible to certainly avoid undesirable effects such as an engine stalling.

In another embodiment, the control system further includes main fuel supply means, auxiliary fuel supply means, and fuel supply control means. The main fuel supply means supplies main fuel containing alcohol to the engine. The auxiliary fuel supply means supplies auxiliary fuel to the engine. A concentration of gasoline in the auxiliary fuel is comparatively high. The fuel supply control means operates the auxiliary fuel supply means according to an operating condition of the engine. The combustion state detecting means detects the combustion state in the engine operating condition in which the auxiliary fuel supply means is made to operate.

With this configuration, the maximum opening is corrected in the decreasing direction when deterioration of the combustion state is detected in the engine operating condition in which the auxiliary fuel supply means is made to operate. Therefore, it is possible to certainly avoid inconvenience such as an engine stall, for example, when the auxiliary fuel is exhausted to make the combustion state deteriorate.

In another embodiment, the control system further includes the abnormality determining means for determining abnormality in the auxiliary fuel supply means. The maximum opening setting means corrects the maximum opening in a decreasing direction when the auxiliary fuel supply means is determined to be abnormal.

With this configuration, the maximum opening is corrected in the decreasing direction when the auxiliary fuel supply means is determined to be abnormal. Therefore, it is possible

DETAILED DESCRIPTION OF THE PREFERRED EMBODIMENTS

Preferred embodiments of the present invention will now be described with reference to the drawings.

First Embodiment

Figure 1:
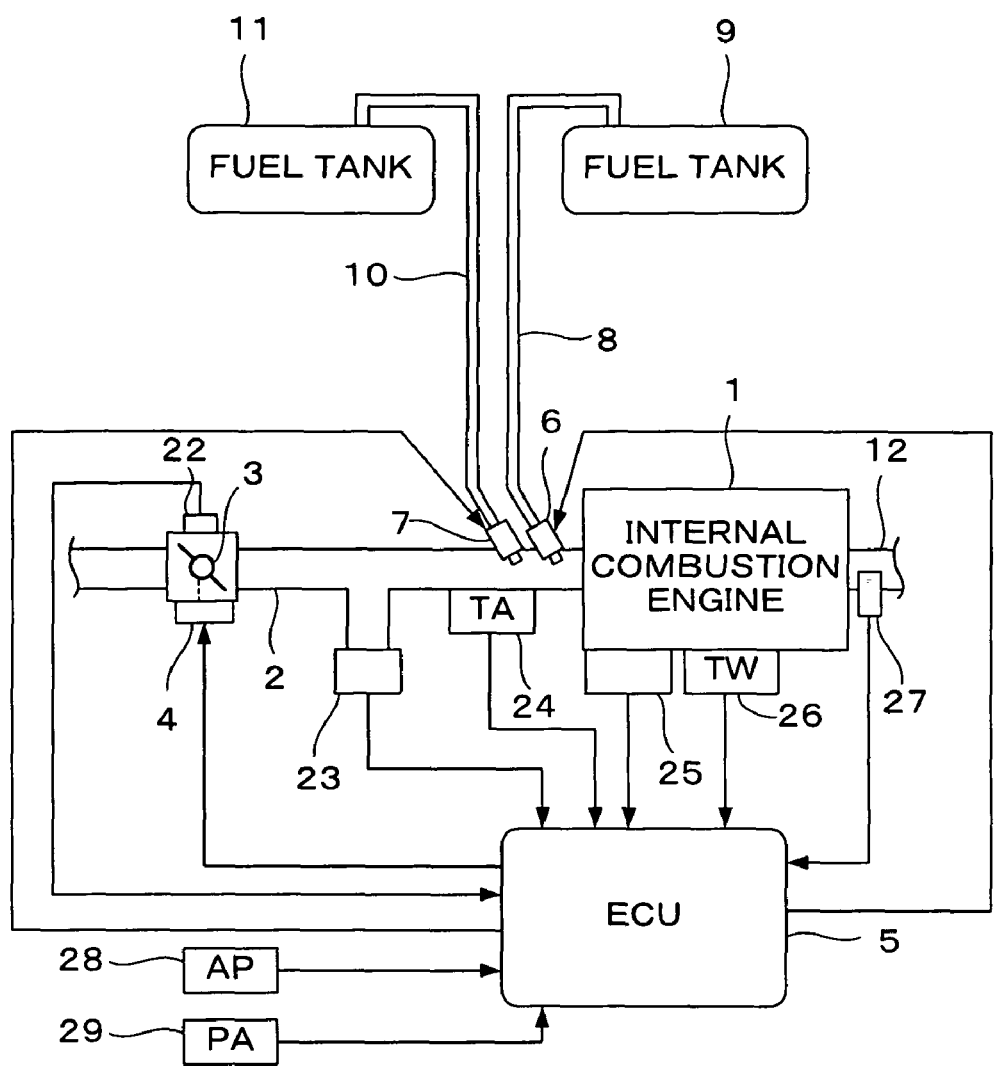
FIG. 1 shows a configuration of an internal combustion engine and a control system therefor according to a first embodiment of the present invention.

FIG. 1 is a schematic diagram showing a configuration of an internal combustion engine and a control system therefor according to a first embodiment of the present invention. The internal combustion engine (hereinafter referred to as "engine") 1 can be a 4-cylinder engine which can be operated using alcohol, gasoline, or gasohol (mixture of alcohol and gasoline) as fuel. The engine 1 has an intake pipe 2 provided with a throttle valve 3. An actuator 4 for actuating the throttle valve 3 can be connected to the throttle valve 3, and the actuator 4 is connected to an electronic control unit (hereinafter referred to as "ECU") 5. The ECU 5 controls an opening TH of the throttle valve 3 through the actuator 4. A throttle valve opening sensor 22 for detecting a throttle valve opening TH is connected to the throttle valve 3, and the detection signal of the throttle valve opening sensor 22 is supplied to the ECU 5.

A fuel supply system for supplying fuel to the engine 1 can include a main fuel supply device and an auxiliary fuel supply device. The main fuel supply device includes a main fuel injection valve 6, a main fuel passage 8, and a main fuel tank 9. The auxiliary fuel supply device includes an auxiliary fuel injection valve 7, an auxiliary fuel passage 10, and an auxiliary fuel tank 11. The main fuel supply device supplies main fuel containing alcohol to the engine 1, and the auxiliary fuel supply device supplies an auxiliary fuel containing gasoline with comparatively high concentration to the engine 1. When the concentration of alcohol in the main fuel is comparatively high, the auxiliary fuel is supplied with the main fuel at the cold start of the engine 1 and during a predetermined time period (e.g., 60 seconds) from the cold start of the engine 1. In other operating conditions of the engine 1, only the main fuel is supplied. Fuel which can ignite at the cold start of the engine, for example, gasoline or gasohol whose concentration of alcohol is equal to or less than about 20%, can be used as the auxiliary fuel.

The main fuel injection valves 6 are inserted into the intake pipe 2 at locations intermediate between the cylinder block of the engine 1 and the throttle valve 3 and slightly upstream of the respective intake valves (not shown). The main fuel injection valves 6 are connected to the main fuel tank 9 through the main fuel passage 8. Further, the auxiliary fuel injection valves 7 can be inserted into the intake pipe 2 in the vicinity of the main fuel injection valves 6 of the respective cylinders. The auxiliary fuel injection valves 7 are connected to the auxiliary fuel tank 11 through the auxiliary fuel passage 10.

The main fuel injection valves 6 and the auxiliary fuel injection valves 7 are electrically connected to the ECU 5. A valve opening period and a valve opening timing of each fuel injection valve 6 and each auxiliary fuel injection valve 7 are controlled by the signals from the ECU 5. The intake pipe 2 is provided with an intake pressure sensor 23 for detecting an intake pressure PBA and an intake air temperature sensor 24 for detecting an intake air temperature TA downstream of the throttle valve 3. The detection signals of these sensors are supplied to the ECU 5.

The engine 1 is provided with a crank angle position sensor 25 for detecting a rotational angle of the crankshaft (not shown) of the engine 1, and a signal corresponding to a detected rotational angle of the crankshaft is supplied to the ECU 5. The crank angle position sensor 25 includes a cylinder discrimination sensor which outputs a pulse (hereinafter referred to as "CYL pulse") at a predetermined crank angle position for a specific cylinder of the engine 1. The crank angle position sensor 25 can also include a top dead center (TDC) sensor which outputs a TDC pulse at a crank angle position before a TDC of a predetermined crank angle starts at an intake stroke in each cylinder (i.e., at every 180 deg crank angle in the case of a four-cylinder engine) and a CRK sensor for generating one pulse (hereinafter referred to as "CRK pulse") with a constant crank angle period (e.g., a period of 6 degs, shorter than the period of generation of the TDC pulse). The CYL pulse, the TDC pulse and the CRK pulse are supplied to the ECU 5. The CYL, TDC, and CRK pulses are used to control various timings, such as the fuel injection timing and the ignition timing, and to detect an engine rotational speed NE.

An engine coolant temperature sensor 26 for detecting an engine coolant temperature TW can be mounted on the body of engine 1, and a detection signal is supplied to the ECU 5. An oxygen concentration sensor (hereinafter referred to as "LAF sensor") 27 for detecting an oxygen concentration in exhaust gases is provided in the exhaust pipe 12 of the engine 1, and a detection signal of the LAF sensor 27 is supplied to the ECU 5.

An accelerator sensor 28 and an atmospheric pressure sensor 29 are also connected to the ECU 5. The accelerator sensor 28 detects a depression amount AP of an accelerator pedal of the vehicle driven by the engine 1 (the depression amount AP will be hereinafter referred to as "accelerator operation amount AP"). The atmospheric pressure sensor 29 detects an atmospheric pressure PA. The detection signals of these sensors are supplied to the ECU 5.

The ECU 5 includes an input circuit having various functions including a function of shaping the waveforms of input signals from the various sensors, a function of correcting the voltage levels of the input signals to a predetermined level, and a function of converting analog signal values into digital signal values. The ECU 5 can also include a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the fuel injection valves 6 and 7, the actuator 4, and the spark plug (not shown) in each cylinder.

The ECU 5 calculates a target opening THO of the throttle valve 3 according to an engine operating condition defined by operating parameters such as the accelerator pedal operation amount AP, the engine rotational speed NE, and the like, and controls the actuator 4 so that the detected throttle valve opening TH coincides with the target opening THO.

Figure 2:
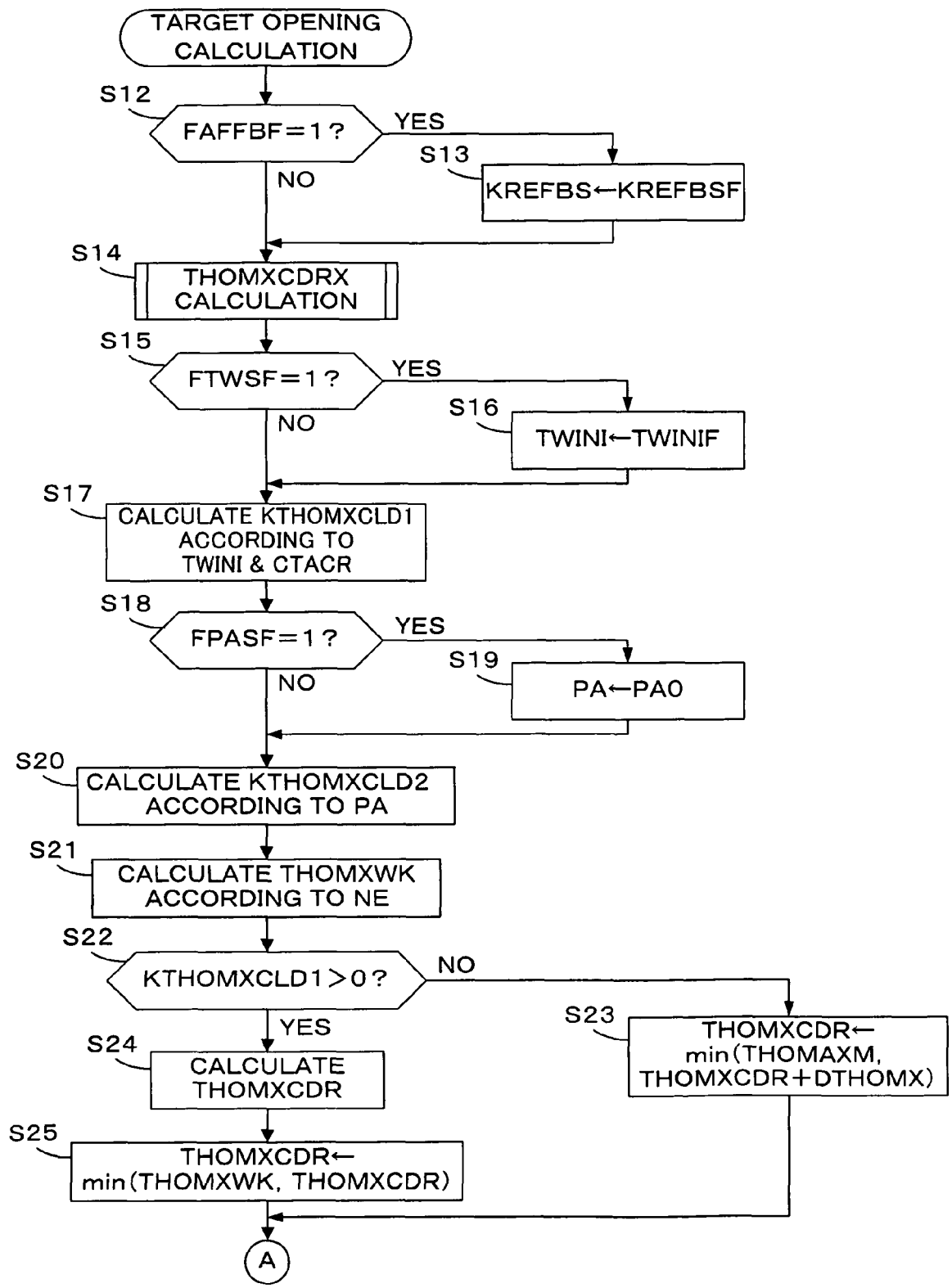
FIGS. 2 and 3 show a flowchart of a process for calculating a target opening (THO) of a throttle valve.
Figure 3:
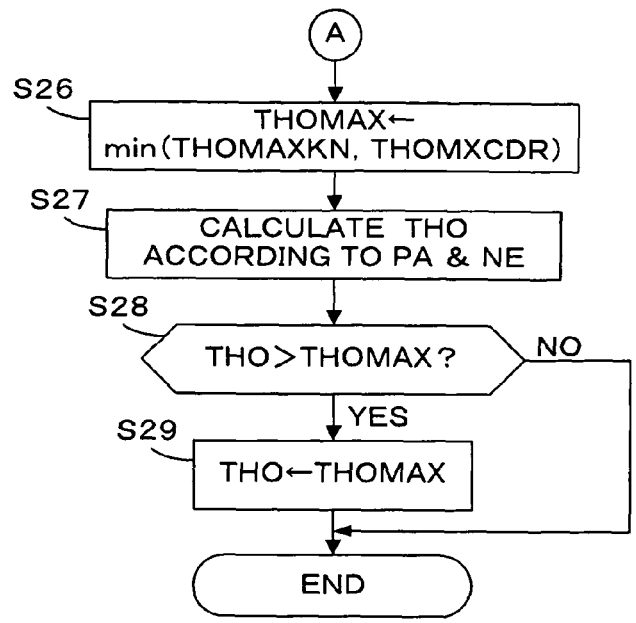

FIGS. 2 and 3 show a flowchart of a process for calculating the target opening THO. This process is executed by the CPU in the ECU 5 at predetermined time intervals (e.g., 10 milliseconds).

In step S12, it can be determined whether or not a feedback control system failure flag FAFFBF is equal to "1". The feedback control system failure flag FAFFBF is set to "1", for example, when a failure of the LAF sensor 27 is detected. If the answer to step S12 is affirmative (YES), an alcohol concentration parameter KREFBS is set to a predetermined value KREFBSF (for example, a value corresponding to the fuel of 100% alcohol concentration) (step S13), and the process proceeds to step S14. In this embodiment, the alcohol concentration parameter KREFBS is set so as to take a value "1.2" when the alcohol concentration is equal to 100% and to take a value "0.7" when the alcohol concentration is equal to 0% (100% gasoline). An accurate value of the alcohol concentration parameter KREFBS cannot be obtained when the feedback control system failure flag FAFFBF is equal to "1". Therefore, by setting the alcohol concentration parameter KREFBS to the predetermined value KREFBSF, the target opening THO can be set to a value which is least like to cause a misfire (a value which causes almost no misfire).

Figure 4:
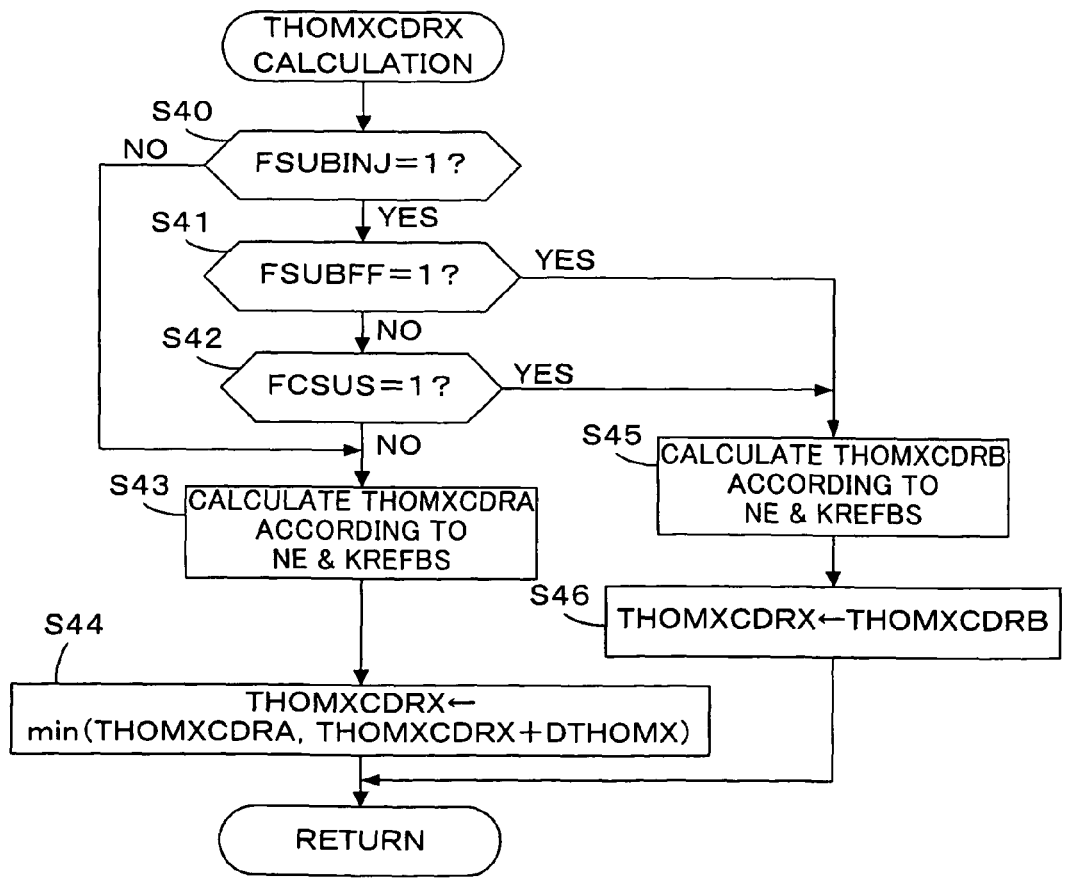
FIG. 4 is a flowchart of a basic maximum opening (THOMXCDRX) calculation process executed in the process of FIG. 2.

If FAFFBF is equal to "0" in step S12, the process immediately proceeds to step S14. In this case, the alcohol concentration parameter KREFBS calculated by the method described below is applied to the process of step S14. In step S14, a THOMXCDRX calculation process shown in FIG. 4 is performed to calculate a basic maximum opening THOMXCDRX according to the alcohol concentration parameter KREFBS and the engine rotational speed NE.

In step S15, it is determined whether or not a coolant temperature sensor failure flag FTWSF is equal to "1". The coolant temperature sensor failure flag FTWSF is set to "1" when a failure of the engine coolant temperature sensor 26 is detected. If the answer to step S15 is affirmative (YES), an initial coolant temperature TWINI is set to a predetermined coolant temperature TWINIF (e.g., −10 degrees centigrade) (step S16), and the process proceeds to step S17. If FTWSF is equal to "0" in step S15, the process immediately proceeds to step S17. In this case, the initial coolant temperature TWINI stored in the memory is applied to the calculation of step S17. The initial coolant temperature TWINI is the coolant temperature TW detected and stored in the memory at the beginning of starting the engine 1.

Figure 5A:
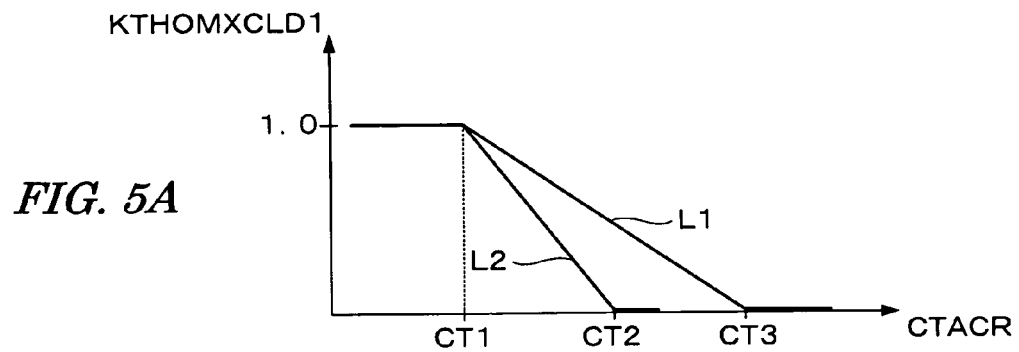
FIGS. 5A-5C show a map and tables which are referred to in the process of FIG. 2.

In step S17, a KTHOMXCLD1 map shown in FIG. 5A is retrieved according to the initial coolant temperature TWINI and an ignition number CTACR, to calculate a coolant temperature correction coefficient KTHOMXCLD1. The ignition number CTACR is a number of ignitions performed after start of the engine 1 (from the time when the cranking ends and the self-sustaining operation starts). The line L1 of FIG. 5A corresponds to a condition where the initial coolant temperature TWINI is equal to "−10 degrees centigrade". The line L2 corresponds to a condition where the initial coolant temperature TWINI is equal to "20 degrees centigrade". That is, the KTHOMXCLD1 map is set so that the coolant temperature correction coefficient KTHOMXCLD1 decreases as the initial coolant temperature TWINI becomes higher, and the coolant temperature correction coefficient KTHOMXCLD1 decreases as the ignition number CTACR increases. "CT1" to "CT3" shown in FIG. 5A are respectively set, for example, to values "2000", "3000", and "5000". It is to be noted that the coolant temperature correction coefficient KTHOMXCLD1 is calculated by the interpolation or the extrapolation when the initial coolant temperature TWINI can, in this example, be equal to a value other than "−10 degrees centigrade" and "20 degrees centigrade".

In step S18, it can be determined whether or not an atmospheric pressure sensor failure flag FPASF is equal to "1". The atmospheric pressure sensor failure flag FPASF is set to "1" when a failure of the atmospheric pressure sensor 29 is detected. If the answer to step S18 is affirmative (YES), the atmospheric pressure PA is set to a predetermined pressure PA0 (e.g., 101.3 kPa) (step S19), and the process proceeds to step S20. If FPASF is equal to "0" in step S18, the process immediately proceeds to step S20. In this case, the detected atmospheric pressure PA is applied to the calculation of step S20.

Figure 5B:
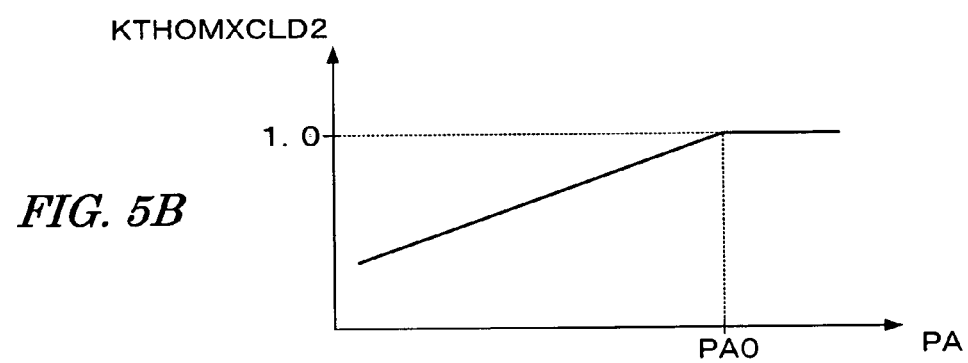

In step S20, a KTHOMXCLD2 table shown in FIG. 5B is retrieved according to the atmospheric pressure PA, to calculate an atmospheric pressure correction coefficient KTHOMXCLD2. The KTHOMXCLD2 table is set so that the atmospheric pressure correction coefficient KTHOMXCLD2 decrease as the atmospheric pressure PA decreases.

Figure 5C:
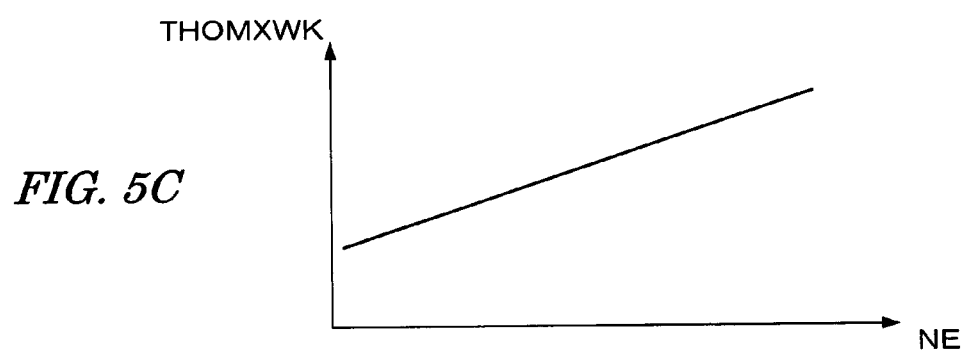

In step S21, a THOMXWK table shown in FIG. 5C is retrieved according to the engine rotational speed NE, to calculate an upper limit value THOMXWK. In step S22, it can be determined whether or not the coolant temperature correction coefficient KTHOMXCLD1 calculated in step S17 is greater than "0". If the answer to step S22 is negative (NO), i.e., KTHOMXCLD1 is equal to "0", it is not necessary to perform the throttle valve opening limitation immediately after the cold start. Therefore, the process can proceed to step S23.

In step S23, a cold state maximum opening THOMXCDR can be calculated by the following equation (1) (step S23). In the equation (1), min(x, y) expresses a calculation for selecting a less value of two values "x" and "y". Further, THOMAXM is a maximum value of the throttle valve opening, and DTHOMX is a predetermined additional value, for example, set to "0.05" [deg]. The cold state maximum opening THOMXCDR is set, immediately after cold start of the engine, to a value less than the maximum value THOMAXM. Therefore, the equation (1) can be used in order to make the cold state maximum opening THOMXCDR gradually increase to the maximum value THOMAXM. After execution of step S23, the process proceeds to step S26 (FIG. 3).

$$THOMXCDR = \min(THOMAXM, THOMXCDR + DTHOMX) \quad (1)$$

If KTHOMXCLD1 is greater than "0" in step S22, the upper limit value THOMXWK, the coolant temperature correction coefficient KTHOMXCLD1, the atmospheric pressure correction coefficient KTHOMXCLD2, and the basic maximum opening THOMXCDRX are applied to the following equation (2), to calculate the cold state maximum opening THOMXCDR (step S24).

$$THOMXCDR = THOMXWK - KTHOMXCLD1 \times KTHOMXCLD2 \times (THOMXWK - THOMXCDRX) \quad (2)$$

In step S25, a limit process is performed by the following equation (3) so that the cold state maximum opening THOMXCDR is set to a value equal to or less than the upper limit value THOMXWK. Normally, the cold state maximum opening THOMXCDR calculated by the equation (2) is equal to or less than the upper limit value THMXWK, and the cold state maximum opening THOMXCDR calculated by the equation (2) is adopted as it is.

$$THOMXCDR = \min(THOMXWK, THOMXCDR) \quad (3)$$

In step S26, a maximum target opening THOMAX is set to the smaller one of the maximum opening THOMAXKN and the cold state maximum opening THOMXCDR by the following equation (4). The maximum opening THOMAXKN is equal to a minimum value among maximum openings set in other processes (not shown). For example, a maximum opening set for preventing the knocking is one of such maximum openings.

$$THOMAX = \min(THOMAXKN, THOMXCDR) \quad (4)$$

In step S27, the target opening THO is calculated according to the accelerator pedal operation amount AP and the engine rotational speed NE. Subsequently, it is determined whether or not the target opening THO is greater than the maximum target opening THOMAX (step S28). If the answer to step S28 is affirmative (YES), the target opening THO is set to the maximum target opening THOMAX (step S29), and the process ends. If the answer to step S28 is negative (NO), the process immediately ends. Accordingly, the target opening THO calculated in step S27 is adopted as it is.

FIG. 4 is a flowchart of the THOMXCDRX calculation process executed in step S14 of FIG. 2.

In step S40, it is determined whether or not an auxiliary fuel injection execution flag FSUBINJ is equal to "1". The auxiliary fuel injection execution flag FSUBINJ is set to "1" when the alcohol concentration of the main fuel is comparatively high and a fuel injection by the auxiliary fuel injection valve 7 is performed at the cold start of the engine 1 and during a predetermined time period (e.g., 60 seconds) after the cold start of the engine 1. The fuel injection by the auxiliary fuel injection valve 7 will be hereinafter referred to as "auxiliary fuel injection".

If the answer to step S40 is negative (NO), the process immediately proceeds to step S43. On the other hand, if the answer to step S40 is affirmative (YES), i.e., when performing the auxiliary fuel injection, the process proceeds to step S41, in which it is determined whether or not a auxiliary fuel supply device failure flag FSUBFF is equal to "1". The auxiliary fuel supply device failure flag FSUBFF is set to "1", when a failure of the auxiliary fuel supply device (for example, a failure of the auxiliary fuel injection valve 7 or an auxiliary fuel pump (not shown)) is detected. If the answer to step S41 is negative (NO), it is further determined whether or not a combustion state flag FCSUS is equal to "1". The combustion state flag FCSUS is set to "1" when unstable combustion (e.g., misfire) of the engine is detected based on time intervals of generation of the CRK pulse output from the crank angle position sensor 25. The misfire determination based on the time intervals of the CRK pulse generation is shown, for example, in Japanese Patent Laid-open No. 2007-198368.

If the answer to step S42 is negative (NO), i.e., if the combustion state is stable, the process proceeds to step S43.

Figure 6A:
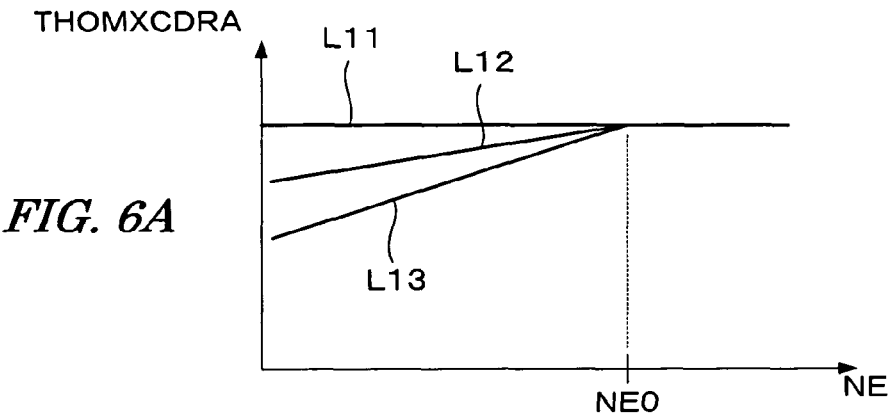
FIGS. 6A and 6B show maps referred to in the process of FIG. 4.

In step S43, a THOMXCDRA map shown in FIG. 6A is retrieved according to the engine rotational speed NE and the alcohol concentration parameter KREFBS, to calculate a normal basic maximum opening THOMXCDRA. The lines L11, L12, and L13 of FIG. 6A respectively correspond to values "1.0", "1.1", and "1.2" of the alcohol concentration parameter KREFBS. That is, in the range where the engine rotational speed NE is less than a predetermined rotational speed NE0 (e.g., 3000 rpm), the THOMXCDRA map is set so that the normal basic maximum opening THOMXCDRA decreases as the engine rotational speed NE decreases, and the normal basic maximum opening THOMXCDRA decreases as the alcohol concentration parameter KREFBS increases. In the range where the engine rotational speed NE is equal to or greater than the predetermined rotational speed NE0, the THOMXCDRA map is set so that the normal basic maximum opening THOMXCDRA takes a constant value. A misfire may occur more easily in a low temperature condition as the alcohol concentration becomes higher. Therefore, limiting the maximum opening to a lower value as the alcohol concentration becomes higher makes it possible to stabilize the combustion state of the engine 1.

In step S44, the basic maximum opening THOMXCDRX is calculated by the following equation (5). The equation (5) is used for gradually changing the basic maximum opening THOMXCDRX from the failure basic maximum opening THOMXCDRB described below to the normal basic maximum opening THOMXCDRA when the combustion state flag FCSUS changes from "1" to "0".

$$THOMXCDRX = \min(THOMXCDRA, THOMXCDRX + DTHOMX) \quad (5)$$

Figure 6B:
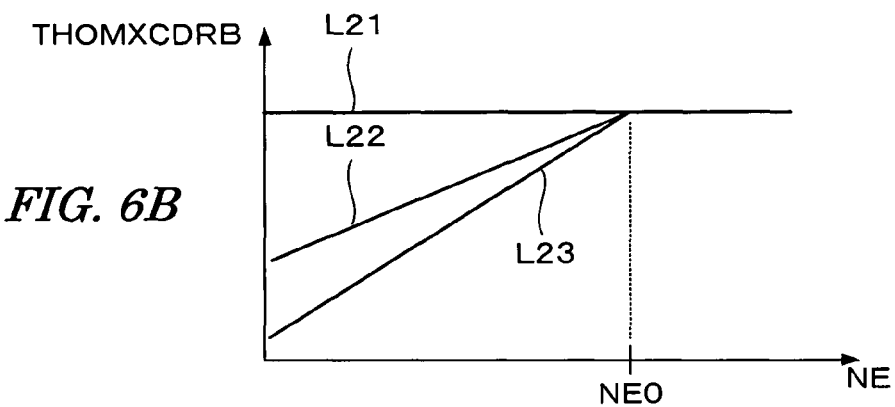

If the answer to steps S41 or S42 is affirmative (YES), i.e., when the failure of the auxiliary fuel supply device is detected or the combustion state is unstable, the process proceeds to step S45, in which a THOMXCDRB map shown in FIG. 6B is retrieved according to the engine rotational speed NE and the alcohol concentration parameter KREFBS, to calculate the failure basic maximum opening THOMXCDRB. The lines L21, L22, and L23 of FIG. 6B respectively correspond to values "1.0", "1.1", and "1.2" of the alcohol concentration parameter KREFB. That is, in the range where the alcohol concentration parameter KREFBS is greater than "1.0", the THOMXCDRB map is set so that the failure basic maximum opening THOMXCDRB is less than the normal basic maximum opening THOMXCDRA. Therefore, when a failure of the auxiliary fuel supply device is detected, and only the main fuel can be supplied, or when the combustion state is unstable in spite of supplying the auxiliary fuel, the maximum opening can be limited to a lower opening, thereby avoiding inconvenience such as an engine stall.

Next, the method for calculating the alcohol concentration parameter KREFBS is described with reference to FIGS. 7 and 8. The calculation of the alcohol concentration parameter KREFBS can be performed when the auxiliary fuel is not supplied; the evaporated fuel is not purged (not supplied); and the fuel supply is not interrupted (the fuel-cut operation is not performed). The calculated alcohol concentration parameter KREFBS is stored in a memory which holds the stored value during stoppage of the engine. The alcohol concentration parameter KREFBS read out from the memory is used at the next start of the engine.

In step S51, an air-fuel ratio A/F of the air-fuel mixture in the combustion chamber can be calculated from the output of the LAF sensor 27. In step S52, a KAF table shown in FIG. 8 is retrieved according to the air-fuel ratio A/F, to calculate a feedback coefficient KAF. The KAF table is set so that the feedback coefficient KAF increases as the air-fuel ratio A/F increases.

In step S53, the feedback coefficient KAF is applied to the following equation (6), to calculate an averaged feedback coefficient KREFX. In the equation (6), "CREF" is an averaging coefficient set to a value between "0" and "1", and "KREFX" on the right side of the equation (6) is a preceding calculated value.

$$KREFX = CREF \times KAF + (1-CREF) \times KREFX \quad (6)$$

In step S54, the averaged feedback coefficient KREFX is applied to the following equation (7), to update the alcohol concentration parameter KREFBS. "KREFBS" on the right side of the equation (7) is a preceding calculated value.

$$KREFBS = KREFBS \times KREFX \quad (7)$$

The feedback coefficient KAF and the alcohol concentration parameter KREFBS can be applied to the following equation (8), to calculate a main fuel injection amount TOUTM. In the equation (8), "TIM" is a basic fuel amount calculated according to the engine rotational speed NE and the intake pressure PBA, and "K1" is another correction coefficient set according to the engine operating condition.

$$TOUTM = TIM \times KAF \times KREFBS \times K1 \quad (8)$$

The detected air-fuel ratio A/F increases as the alcohol concentration in the fuel becomes higher, and accordingly the feedback coefficient KAF increases, to make the alcohol concentration parameter KREFBS increase. If the alcohol concentration in the fuel does not change, the feedback coefficient KAF decreases with increase in the alcohol concentration parameter KREFBS, and the averaged feedback coefficient KREFX converges to "1.0". Consequently, the alcohol concentration parameter KREFBS converges to a value corresponding to the alcohol concentration.

Figure 7:
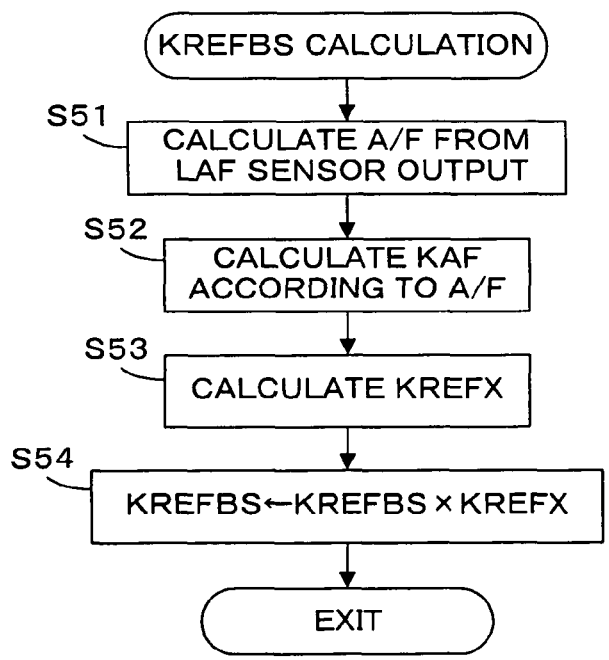
FIG. 7 is a flowchart for illustrating a calculation method of an alcohol concentration parameter (KREFBS)
Figure 8:
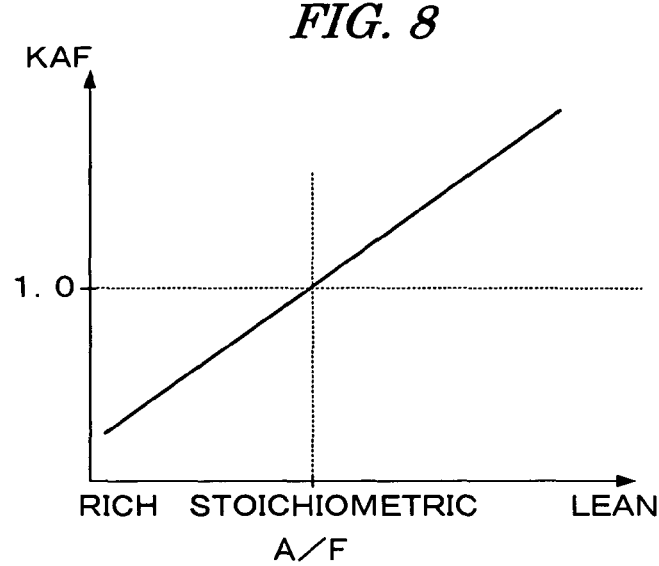
FIG. 8 shows a table referred to in the process of FIG. 7.

The alcohol concentration parameter KREFBS calculated in the process of FIG. 7 is a parameter indicative of the alcohol concentration of the main fuel. When the auxiliary fuel is additionally supplied, the actual alcohol concentration of the mixed fuel can be calculated, since the alcohol concentration of the auxiliary fuel is known, and a ratio of the auxiliary fuel injection amount to the main fuel injection amount is set to a predetermined ratio. Accordingly, the THOMXCDRA map shown in FIG. 6A is set taking the influence of the auxiliary fuel injection into account. Therefore, as described above, the alcohol concentration parameter KREFBS calculated in the process of FIG. 7 can be used for calculating the normal basic maximum opening THOMXCDRA.

In the above-described embodiment, the cold state maximum opening THOMXCDR is set according to the alcohol concentration parameter KREFBS indicative of the concentration of the alcohol in the fuel, the initial coolant temperature TWINI indicative of the engine temperature, and the ignition number CTACR after start of the engine. Further, the throttle valve opening TH is limited to a value which is equal to less than the cold state maximum opening THOMXCDR. The initial coolant temperature TWINI upon starting of the engine and the ignition number CTACR after start of the engine are significantly correlative with the temperature in the combustion chamber of the engine 1. Therefore, by setting the cold state maximum opening THOMXCDR according not only to the alcohol concentration parameter KREFBS but also to the initial coolant temperature TWINI and the ignition number CTACR, the cold state maximum opening THOMX-CDR can be set suitably for the temperature in the combustion chamber. Consequently, a good combustion state can be maintained while suppressing deterioration of the drivability by preventing the throttle valve opening TH from being subjected to excessive limitation.

Further, when the combustion state flag FCSUS is set to "1", i.e., deterioration of the combustion state of the engine is detected upon supplying the auxiliary fuel, or when a failure of the auxiliary fuel supply device is detected, the cold state maximum opening THOMXCDR is corrected in the decreasing direction (step S11 of FIG. 2, step S41, S42, S45 of FIG. 4). Accordingly, it is possible to avoid inconvenience such as an engine stall.

In this embodiment, the main fuel injection valve 6, the main fuel passage 8, and the main fuel tank 9 correspond to the main fuel supply means. The auxiliary fuel injection valve 7, the auxiliary fuel passage 10, and the auxiliary fuel tank 11 correspond to the auxiliary fuel supply means. The ECU 5 constitutes the fuel supply control means, the abnormality determining means, the maximum opening setting means, the target opening setting means, the throttle valve opening control means, and the combustion state detecting means. Specifically, steps S11 to S26 of FIGS. 2 and 3 correspond to the maximum opening setting means, and steps S27 to S29 of FIG. 3 correspond to the target opening setting means.

Second Embodiment

Figure 9:
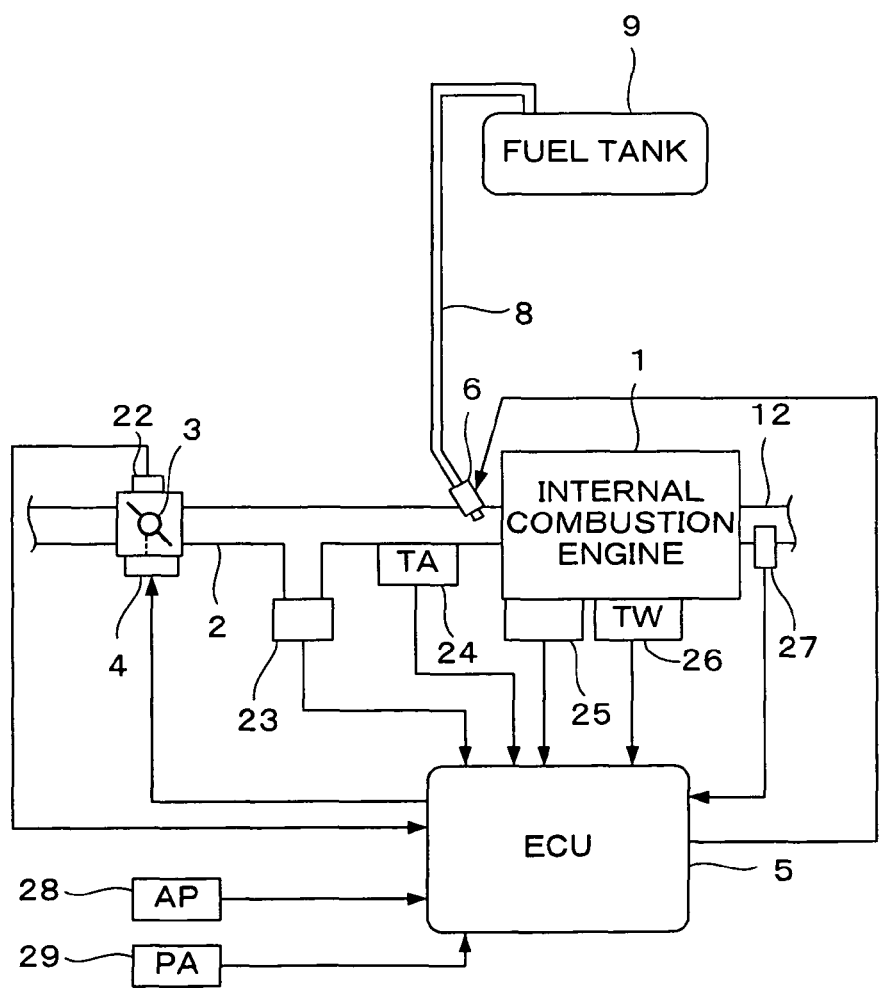
FIG. 9 shows a configuration of an internal combustion engine and a control system therefor according to a second embodiment of the present invention.

FIG. 9 is a schematic diagram showing a configuration of an internal combustion engine and a control system therefor according to a second embodiment of the present invention. The configuration shown in FIG. 9 is obtained by deleting the auxiliary fuel supply device shown in FIG. 1, i.e., the auxiliary fuel injection valve 7, the auxiliary fuel passage 10, and the auxiliary fuel tank 11. The configuration shown in FIG. 9 is the same as that shown in FIG. 1 except for the above-described point. That is, in this embodiment, the auxiliary fuel is not used and the engine 1 is operated using only the main fuel. The present embodiment is the same as the first embodiment except for the points described below.

Figure 10:
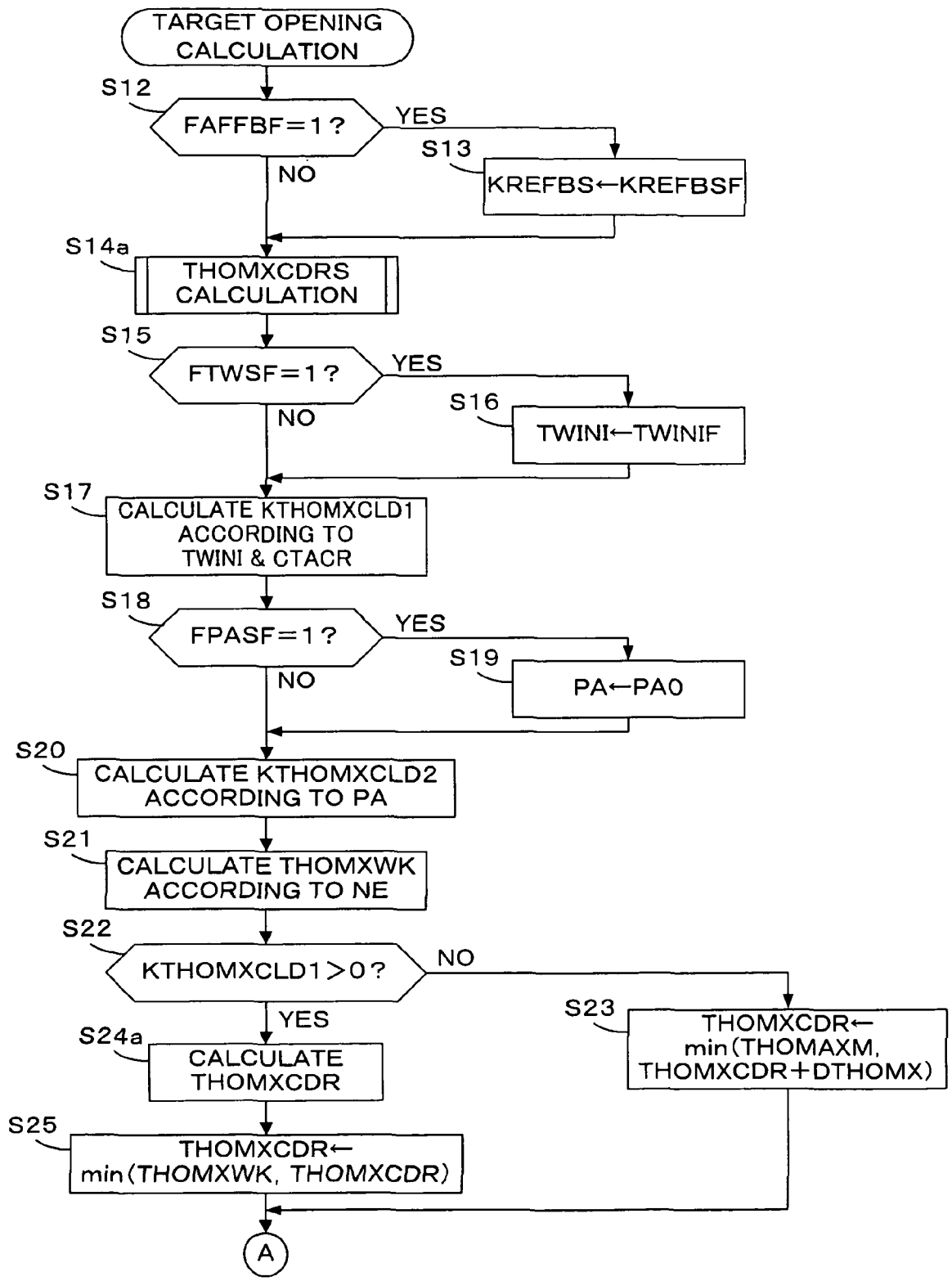
FIG. 10 is a flowchart of a process for calculating the target opening (THO) of the throttle valve.

FIG. 10 is a flowchart of the target opening calculation process in this embodiment. This process is obtained by changing steps S14 and S24 of FIG. 2 respectively to steps S14a and S24a.

Figure 11:
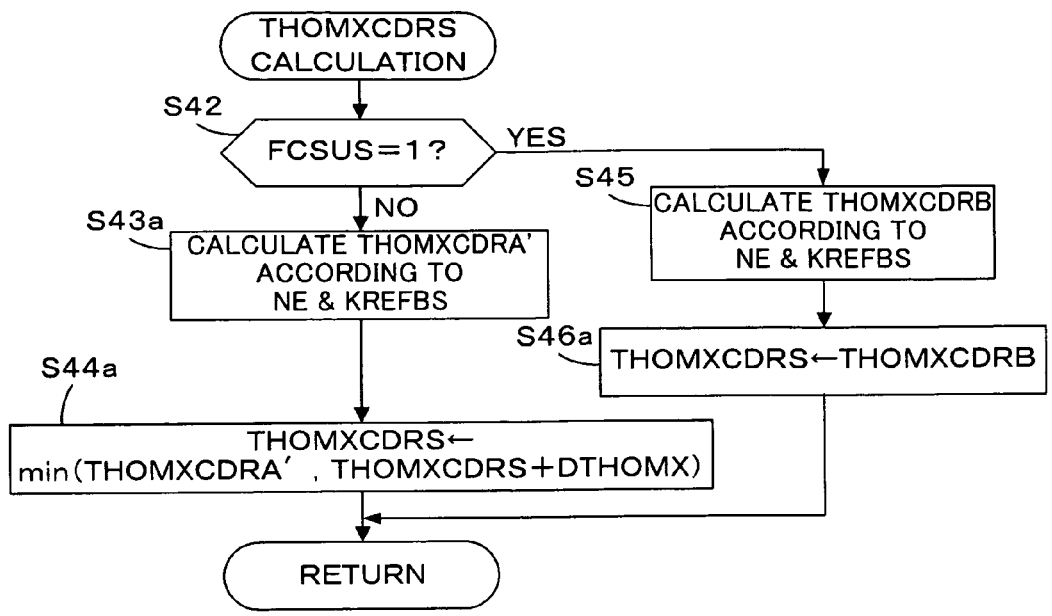
FIG. 11 is a flowchart of the basic maximum opening (THOMXCDRS) calculation process executed in the process of FIG. 10.

In step S14a, a THOMXCDRS calculation process shown in FIG. 11 is performed to calculate a basic maximum opening THOMXCDRS. The THOMXCDRS calculation process of FIG. 11 is obtained by deleting step S40 and S41 of the THOMXCDRX calculation process shown in FIG. 4, and changing steps S43, S44, and S46 of FIG. 4 respectively to steps S43a, S44a, and S46a.

Figure 12:
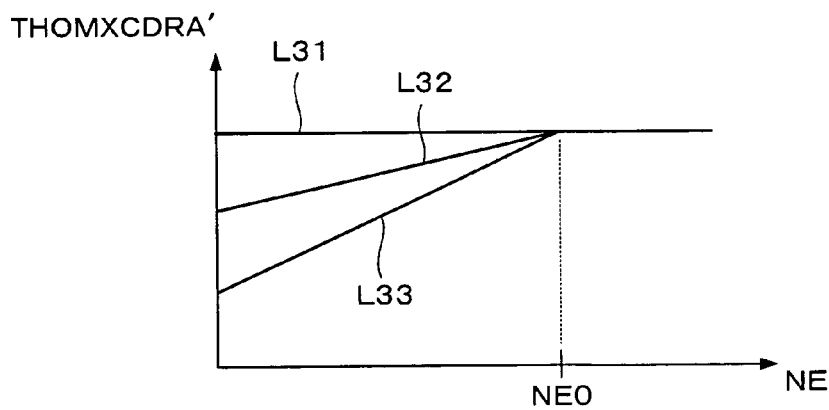
FIG. 12 shows a map referred to in the process of FIG. 11.

In step S43a, a THOMXCDRA' map shown in FIG. 12 is retrieved according to the engine rotational speed NE and the alcohol concentration parameter KREFBS, to calculate a normal basic maximum opening THOMXCDRA'. The lines L31, L32, and L33 shown in FIG. 12 respectively correspond to values "1.0", "1.1", and "1.2" of the alcohol concentration parameter KREFBS. That is, the THOMXCDRA' map is set so that the normal basic maximum opening THOMXCDRA' is slightly less than the normal basic maximum opening THOMXCDRA of the THOMXCDRA map shown in FIG. 6A in a region where the alcohol concentration is comparatively high. This is because the auxiliary fuel injection is not performed in the second embodiment.

In step S44a, the basic maximum opening THOMXCDRS is calculated by the following equation (5a).

$$THOMXCDRS = \min(THOMXCDRA', THOMXCDRS + DTHOMX) \quad (5a)$$

In step S46a, the basic maximum opening THOMXCDRS is set to the failure basic maximum opening THOMXCDRB calculated in step S45.

Referring back to FIG. 10, the cold state maximum opening THOMXCDR is calculated by the following equation (2a) in step S24a. The equation (2a) is obtained by changing the basic maximum opening THOMXCDRX in the equation (2) to the basic maximum opening THOMXCDRS calculated in step S14a.

$$THOMXCDR = THOMXWK \times KTHOMXCLD1 \times KTHOMXCLD2 \times (THOMXWK - THOMXCDRS) \quad (2a)$$

The process after step S23 or S25 is the same as the corresponding process of FIG. 3.

Also in this embodiment, the cold state maximum opening THOMXCDR is set according to the alcohol concentration parameter KREFBS indicative of the concentration of alcohol in the fuel, the initial coolant temperature TWINI indicative of the engine temperature, and the ignition number CTACR after start of the engine, and the throttle valve opening TH is limited to a value equal to or less than the cold state maximum opening THOMXCDR. Therefore, good combustion state can be maintained while suppressing deterioration of the drivability by preventing the throttle valve opening TH from being subjected to excessive limitation.

Further, when deterioration of the combustion state of the engine is detected (FCSUS=1), the cold state maximum opening THOMXCDR is corrected in the decreasing direction (FIG. 11, step S42, S45). Accordingly, it is possible to certainly avoid inconvenience such as an engine stall.

In this embodiment, the ECU 5 constitutes the fuel supply control means, the maximum opening setting means, the target opening setting means, the throttle valve opening control means, and the combustion state detecting means. Specifically, steps S12 to S25 of FIG. 10 correspond to a part of the maximum opening setting means.

The present invention is not limited to the embodiments described above, and various modifications may be made. For example, in the embodiments described above, the cold state maximum opening THOMXCDR is set according to the alcohol concentration parameter KREFBS indicative of the alcohol concentration of the main fuel. Alternatively, the alcohol concentration detected by an alcohol concentration sensor may be used instead of the alcohol concentration parameter KREFBS.

Further, any one of steps S41 and S42 in the process of FIG. 4 may be deleted. That is, step S41 may be deleted when the failure detection of the auxiliary fuel supply device is not performed. Step S42 may be deleted when the deterioration determination of the combustion state is not performed.

Further, in the above-described embodiments, the initial coolant temperature TWINI is used as a parameter indicative of the engine temperature. Alternatively, an initial lubricating oil temperature or an initial temperature of a predetermined portion of the engine 1 may be used as a parameter indicative of the engine temperature.

The present invention can be applied also to a control system for a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine in which fuel containing alcohol is used, said control system comprising:

maximum opening setting means for setting a maximum opening of a throttle valve of said engine;

target opening setting means for setting a target opening of said throttle valve to a value which is equal to or less than the maximum opening;

throttle valve opening control means for controlling an opening of the throttle valve so as to coincide with the target opening, wherein said maximum opening setting means sets the maximum opening according to a concentration parameter indicative of a concentration of alcohol in the fuel, a temperature parameter indicative of a temperature of said engine, and a number of ignitions performed after start of said engine.

2. A control system according to claim 1, wherein said maximum opening setting means includes combustion state detecting means for detecting deterioration of a combustion state of said engine, and corrects the maximum opening in a decreasing direction when the deterioration of the combustion state is detected.

3. A control system according to claim 2, further comprising:

main fuel supply means for supplying main fuel containing alcohol to said engine;

auxiliary fuel supply means for supplying auxiliary fuel to said engine, a concentration of gasoline in the auxiliary fuel being comparatively high; and fuel supply control means for operating said auxiliary fuel supply means according to an operating condition of said engine, wherein said combustion state detecting means detects the combustion state in the engine operating condition in which said auxiliary fuel supply means is made to operate.

4. A control system according to claim 1, further comprising:

main fuel supply means for supplying main fuel containing alcohol to said engine;

auxiliary fuel supply means for supplying auxiliary fuel to said engine, a concentration of gasoline in the auxiliary fuel being comparatively high; and abnormality determining means for determining abnormality in said auxiliary fuel supply means, wherein said maximum opening setting means corrects the maximum opening in a decreasing direction when said auxiliary fuel supply means is determined to be abnormal.

5. A control method for an internal combustion engine in which fuel containing alcohol is used, said control method comprising the steps of:

a) setting a maximum opening of a throttle valve of said engine;

b) setting a target opening of said throttle valve to a value which is equal to or less than the maximum opening; and c) controlling an opening of the throttle valve so as to coincide with the target opening, wherein the maximum opening is set according to a concentration parameter indicative of a concentration of alcohol in the fuel, a temperature parameter indicative of a temperature of said engine, and a number of ignitions performed after start of said engine.

6. A control method according to claim 5, wherein said step a) includes the steps of:
   d) detecting deterioration of a combustion state of said engine; and
   e) correcting the maximum opening in a decreasing direction when the deterioration of the combustion state is detected.

7. A control method according to claim 6, wherein said engine is provided with a main fuel supply device for supplying main fuel containing alcohol to said engine and an auxiliary fuel supply device for supplying auxiliary fuel to said engine, a concentration of gasoline in the auxiliary fuel being comparatively high, and said control method further includes the step of f) operating said auxiliary fuel supply device according to an operating condition of said engine,
   wherein the combustion state is detected in the engine operating condition in which said auxiliary fuel supply device is made to operate.

8. A control method according to claim 5, wherein said engine is provided with a main fuel supply device for supplying main fuel containing alcohol to said engine and an auxiliary fuel supply device for supplying auxiliary fuel to said engine, a concentration of gasoline in the auxiliary fuel being comparatively high, and said step a) includes the steps of:
   g) determining abnormality in said auxiliary fuel supply device; and
   h) correcting the maximum opening in a decreasing direction when said auxiliary fuel supply device is determined to be abnormal.

9. A control system for an internal combustion engine, said control system comprising:
   a maximum opening setting unit, configured to set a maximum opening of a throttle valve of the internal combustion engine;
   a target opening setting unit, configured to set a target opening of the throttle valve to a value which is equal to or less than the maximum opening; and
   a throttle valve opening control unit, configured to control an opening of the throttle valve so as to coincide with the target opening,
   wherein said maximum opening setting unit is further configured to set the maximum opening according to a concentration parameter indicative of a concentration of alcohol in a fuel, a temperature parameter indicative of a temperature of the internal combustion engine, and a number of ignitions performed after start of the engine.

10. A control system according to claim 9, when said maximum opening setting unit includes a combustion state detecting unit which is configured to detect deterioration of a combustion state of the internal combustion engine, and also configured to correct the maximum opening in a decreasing direction when the deterioration of the combustion state is detected.

11. A control system according to claim 10, said control system further comprising:
   a main fuel supply unit configured to supply a main fuel containing alcohol to the internal combustion engine;
   an auxiliary fuel supply unit configured to supply an auxiliary fuel to the internal combustion engine, when a concentration of gasoline in the auxiliary fuel is comparatively high; and
   a fuel supply control unit configured to operate the auxiliary fuel supply unit according an operating condition of the internal combustion engine,
   wherein the combustion state detecting unit is further configured to detect a combustion state in the engine operating condition in which the auxiliary fuel supply unit operates.

12. A control system according to claim 9, further comprising:
   a main fuel supply unit configured to supply main fuel containing alcohol to the engine;
   an auxiliary fuel supply unit configured to supply an auxiliary fuel to the engine, wherein a concentration of gasoline in the auxiliary fuel is comparatively high; and
   an abnormality determining unit configured to determine an abnormality in the auxiliary fuel supply unit, wherein the maximum opening setting unit is configured to correct the maximum opening in a decreasing direction when the auxiliary fuel supply unit is determined to be abnormal.

* * * * *